(12) United States Patent
Stanich et al.

(10) Patent No.: US 6,597,813 B1
(45) Date of Patent: *Jul. 22, 2003

(54) MASKS WITH MODULATED CLUSTERING AND APERIODICITY AND RESCALING OF MASKS

(75) Inventors: Mikel J. Stanich, Longmont, CO (US); Gerhard R. Thompson, Wappingers Falls, NY (US); Charles P. Tresser, Mamaroneck, NY (US); Chai W. Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/265,861

(22) Filed: Mar. 11, 1999

(51) Int. Cl.$^7$ .............................. G06K 9/36; G06K 9/56; G06F 15/00
(52) U.S. Cl. ...................... 382/237; 382/205; 358/3.16; 358/3.19
(58) Field of Search ................................ 382/232, 237, 382/205; 358/3.16, 3.17, 3.13, 3.2, 3.19

(56) References Cited

U.S. PATENT DOCUMENTS 5,111,310 A * 5/1992 Parker et al. .............. 358/3.19
5,602,943 A * 2/1997 Velho et al. ................ 382/266
5,917,951 A * 6/1999 Thompson et al. ......... 382/237

* cited by examiner

Primary Examiner—Edward Coles
Assistant Examiner—Monica Mitchell
(74) Attorney, Agent, or Firm—Stephen C. Kaufman

(57) ABSTRACT

A technique combines most of the advantages of both blue noise and clustering in generating a partially clustered aperiodic mask and using it in a dither array algorithm for halftoning, such that the amount of clustering can be modulated. A method to create an enlarged partially clustered aperiodic dither mask, appearing as a modulated version of a periodic enlargement of original mask, is used when the original mask generates patterns that are not visually pleasing or the original mask doesn't generate enough distinct grey levels. The method of halftoning of grey scale images utilizes a pixel-by-pixel comparison of the image against a partially clustered aperiodic mask in which the clustered aperiodic mask is comprised of a partly random and partly deterministic single valued function which is designed to produce visually pleasing dot configurations when thresholded at any level of grey. A method for changing a number of distinct grey levels a mask can produce to be used in halftoning of grey scale images produces advantages for some printing devices.

22 Claims, 5 Drawing Sheets

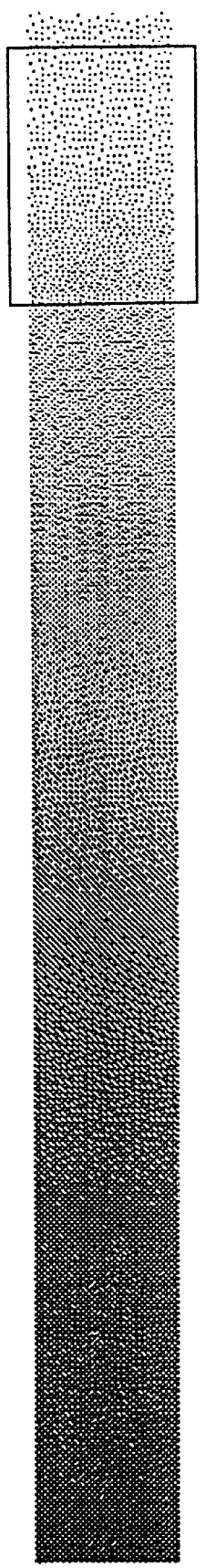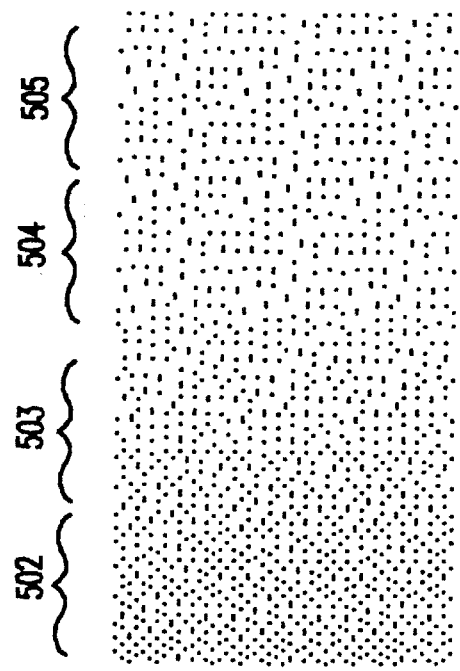
FIG.5A
FIG.5B

MASKS WITH MODULATED CLUSTERING AND APERIODICITY AND RESCALING OF MASKS

CROSS-REFERENCE TO RELATED APPLICATIONS

The present invention builds on and improves upon the inventions disclosed in application Ser. No. 08/909,535 filed on Aug. 12, 1997, by Gerhard Thompson, Charles Tresser, and Chai Wah Wu for "Multicell Clustered Mask with Blue Noise Adjustments", now U.S. Pat. No. 6,025,930, and application Ser. No. 08/943,881 filed on Oct. 13, 1997, by Gerhard Thompson, Charles Tresser, and Chai Wah Wu for "Clustered Aperiodic Mask", now U.S. Pat. No. 5,917,951, both assigned to a common assignee herewith. The disclosures of applications Ser. Nos. 08/909,535 and 08/943,881 are incorporated herein by reference.

BACKGROUND OF THE INVENTION

1. Field of the Invention

The present invention generally relates to digital halftoning techniques in printers and, more particularly, to a method and apparatus for halftoning which constructs and utilizes a clustered aperiodic mask in a dithering algorithm such that the amount of clustering can be modulated. The present invention also discloses how to modify masks so as to print different numbers of grey levels and how to construct a larger mask out of a given one.

2. Background Description

Most printers today can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture of black and white dots can appear to display grey colors when viewed from some distance.

The fastest and most commonly used methods for digital halftoning are dithering algorithms which use threshold arrays, also called dither matrices or dither masks. A dither mask, defined either in hardware or in software, can be thought of as matrix of numbers.

Too much randomness in the design of a dither mask blurs the image and yields unaesthetic results. Based on the discovery that blue noise, or noise with the low frequencies attenuated, gives a good visual effect, as described for instance in "Dithering With Blue Noise", *Proc. IEEE* 76, no.1 (1988) pp. 56–79, by R. Ulichney, methods to construct dithering masks with blue noise were proposed for instance in U.S. Pat. No. 5,111,310 to K. J. Parker and T. Mitsa, by M. Yao and K. J. Parker in "Modified Approach to the Construction of a Blue Noise Mask", *J. of Electronic Imaging* 3, no. 1, (1994) pp. 92–97, and in "The Void-and-Cluster Method for Dither Array Generation", *Proc. SPIE* 1913 (1993) pp. 332–343, by H. Ulichney.

These blue noise masks generate dispersed dots, which means in particular that black dots can only cluster if the grey level is dark enough to make it improbable or impossible to have all black dots isolated. As a consequence, they are not practical for laser printers or xerographic printers.

To achieve clustering, one can use a traditional threshold array constructed so that increasing the grey level corresponds to printing larger and larger clusters at a fixed periodicity. This method does not produce unpleasant artifacts. However, either the number of grey levels that can be represented using such a method is too small or the clusters which are generated are too big. To correct these effects, one usually uses a multi-cell array, which includes several single-cluster threshold arrays. In a multi-cell array, several clusters are grown with the same spatial period as in the single-cluster array, but are not grown simultaneously with each other. This allows for additional intermediate grey levels.

Once a mask is devised for halftoning grey scale pictures, prior art allows one to use it for color pictures. The individual color planes are halftoned using rotated periodic masks, in order to avoid moire patterns, or other changes are made to aperiodic masks such as described for instance in U.S. Pat. No. 5,341,228 to K. J. Parker and T. Mitsa in the case of a blue noise mask. Adaptation of masks to halftone images for displaying on a multi-bit device is also standard.

Some of these techniques and others are reviewed in the book *Digital Halftoning*, MIT Press, Cambridge, Mass. (1987) by R. Ulichney, which is a general reference for digital halftoning.

To summarize, two important problems which have been largely unsolved were to produce clustered aperiodic masks and multi-cell masks with no artifacts in the following sense: Typically, a multi-cell clustered dither array, when tested on all possible levels of uniform greys, will generate both good and less acceptable patterns, depending on the uniform grey level to be rendered and on the physical characteristics of the printer. These problems were addressed respectively in applications Ser. Nos. 08/909,535 and 08/943,881 cited above.

It is a common object of these inventions to provide techniques which combine the advantages of blue noise and clustering in order to produce a generally acceptable pattern of halftoning as needed, for instance, in laser or xerographic printers.

More specifically, according to the application Ser. No. 08/909,535, the multi-cell clustered dither array patterns of the prior art are replaced by less periodic ones while preserving all benefits of the classical methods. In this way, the invention leaves the nicest patterns unchanged. The invention includes the modification of the dither array to obtain the advantages of blue noise and clustering. The preferred embodiment of the invention provided an automated process of redistributing the locations of the threshold values in the mask that correspond to bad grey levels. This allowed one to obtain more pleasant "blueish" effects in the rendering of these grey levels. This invention applies as well to correct bad or unpleasant looking patterns in any kind of dither mask, including dispersed order dither masks or blue noise masks.

On the other hand, according to the application Ser. No. 08/943,881, there is provided a method of halftoning of grey scale images by utilizing a pixel-by-pixel comparison of the image against a clustered aperiodic mask in which the clustered aperiodic mask is comprised of a partly random and partly deterministic single valued function which is designed to produce visually pleasing dot configurations when thresholded at any level of grey. The object of this invention was to describe a method which allows one to construct dither masks which are not random since clusters are formed by design (in nice patterns), but still present the same lack of periodicity which makes blue noise pleasant to the eye.

The inventions in applications Ser. Nos. 08/909,535 and 08/943,881 were conceived for high resolution printers, say about 600 dpi (dots per inch) or above, and give excellent results for such printers as determined by field testing against results of previously existing methods. However, they still induce undesirable artifacts when applied to low resolution devices, such as low resolution printers or facsimile machines.

It is also a general problem in digital halftoning that actual printed dots differ, often a lot, from theoretically perfectly square or rectangular pixels. One typical consequence of this effect is that a mask devised to produce some number L+1, of distinct grey levels to be rendered in fact can only render a smaller number of grey levels. Also, modern technologies such as the Post Script Level 3 format, allow one to represent more distinct grey levels than before whenever appropriate masks can be used. It is consequently highly desirable to be able to vary as much as possible the number of distinct grey levels to be rendered. In particular, one would like to be able to adapt a mask with nice properties so as to render a different number of grey levels.

It is also a general problem in digital halftoning that masks which are too small produce undesirable effects due to the fact that a pattern of the size of the mask is visible. In the context of printing, masks which are judged large by current standards are often called aperiodic.

SUMMARY OF THE INVENTION

It is therefore an object of the present invention to provide a technique which allows one to extend the advantages of the inventions disclosed in applications Ser. Nos. 08/909,535 and 08/943,881 to a greater variety of printing devices, in particular but not only, some with low resolution such as most facsimile machines. In applications Ser. Nos. 08/909, 535 and 08/943,881, the dots are isolated up to a specific grey level, say $g_0$, and the dots are clustered for all grey levels greater than $g_0$. This present invention has the advantage in that clustering is modulated when constructing the mask from lightest to darkest grey levels. Clustering is modulated in the sense that the clustering criteria can be imposed or not depending on the grey level as the dots are formed from the lightest to the darkest grey.

It is also an object of the present invention to provide a technique to vary the number of distinct grey levels to be rendered while preserving desired properties of a mask.

It is also an object of the present invention to provide a technique to increase the size of a mask while preserving desired properties of a mask.

BRIEF DESCRIPTION OF THE DRAWINGS

The foregoing and other objects, aspects and advantages will be better understood from the following detailed description of a preferred embodiment of the invention with reference to the drawings, in which:

FIG. 4b shows an enlarged section of FIG. 4a; and FIG. 5a shows ramps of grey levels for low resolution printing obtained with the present invention, and FIG. 5b shows in enlarged section of FIG. 5a.

DETAILED DESCRIPTION OF A PREFERRED EMBODIMENT OF THE INVENTION

Figure 1:
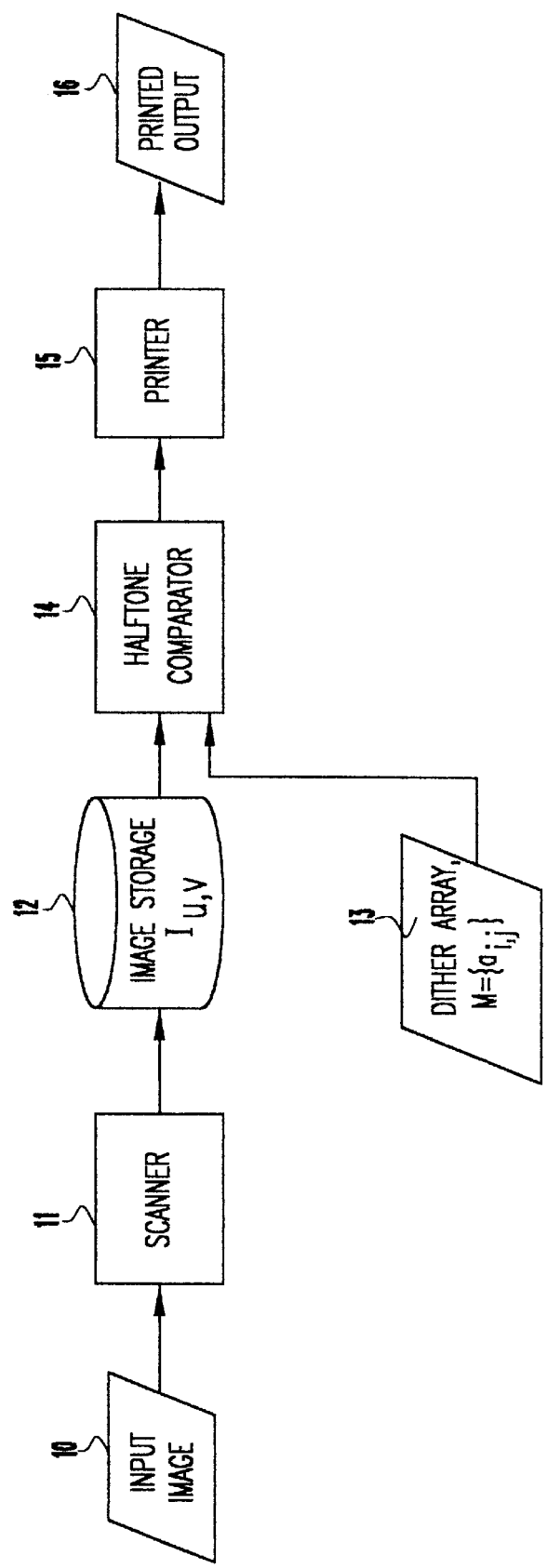
FIG. 1 is a block diagram of a halftoning system on which the invention may be implemented.

Referring now to the drawings, and more particularly to FIG. 1, there is shown in block diagram form the data flow from the input image to the printer: it represents the general method of digital halftoning using a dithering mask. More specifically, the input image 10 is scanned by a scanner 11 and stored in image storage 12 as image $I_{u,v}$ where (u,v) is the pixel location. A dither mask 13 is used to halftone the image in storage 12.

If L+1 is the number of grey levels to be represented, any m×n matrix $M=\{a_{ij}\}$ we consider in this description is an array of numbers between 0 and L. These numbers represent threshold levels. Any dithering algorithm works as follows. Using the dither mask 13, $M=\{a_{ij}\}$, the pixel at location (u,v) in image storage 12 will get printed as a black dot if and only if $a_{u',v'}$ is greater than the grey level on the image to be printed at location (u,v), where u'=u mod m, v'=v mod n. This is determined in the comparator 14, the output of which is sent to the printer 15. As usual in number theory, c mod d stands for the remainder of the division of c by d.

From the geometric point of view, the dither mask 13 will be an m×n rectangular array (where m mod n stands for the number of pixels on each side), but (as is usually the case) its construction will be implemented by assuming periodic boundary conditions so that the array can be thought of as being a two dimensional torus. Whenever we speak of the distance between two points in the array or use a related concept, we mean the distance on the torus and not on the rectangle. We will also use the symbol M to designate the array given in the form of a matrix, and it should be clear whether we mean the rectangle, the torus, the matrix, mask, or whichever.

With $\mathbb{R}$ standing for the set of real numbers, and $\mathbb{R}^2$ standing for the plane parameterized by two coordinates which are real numbers, we chose some function r: $\mathbb{R}^2 \to R$ with a maximum at the origin and decreasing when moving away from the origin or alternatively with a minimum at the origin and increasing when moving away from the origin. The function r is to be interpreted as a potential function.

Figure 3:
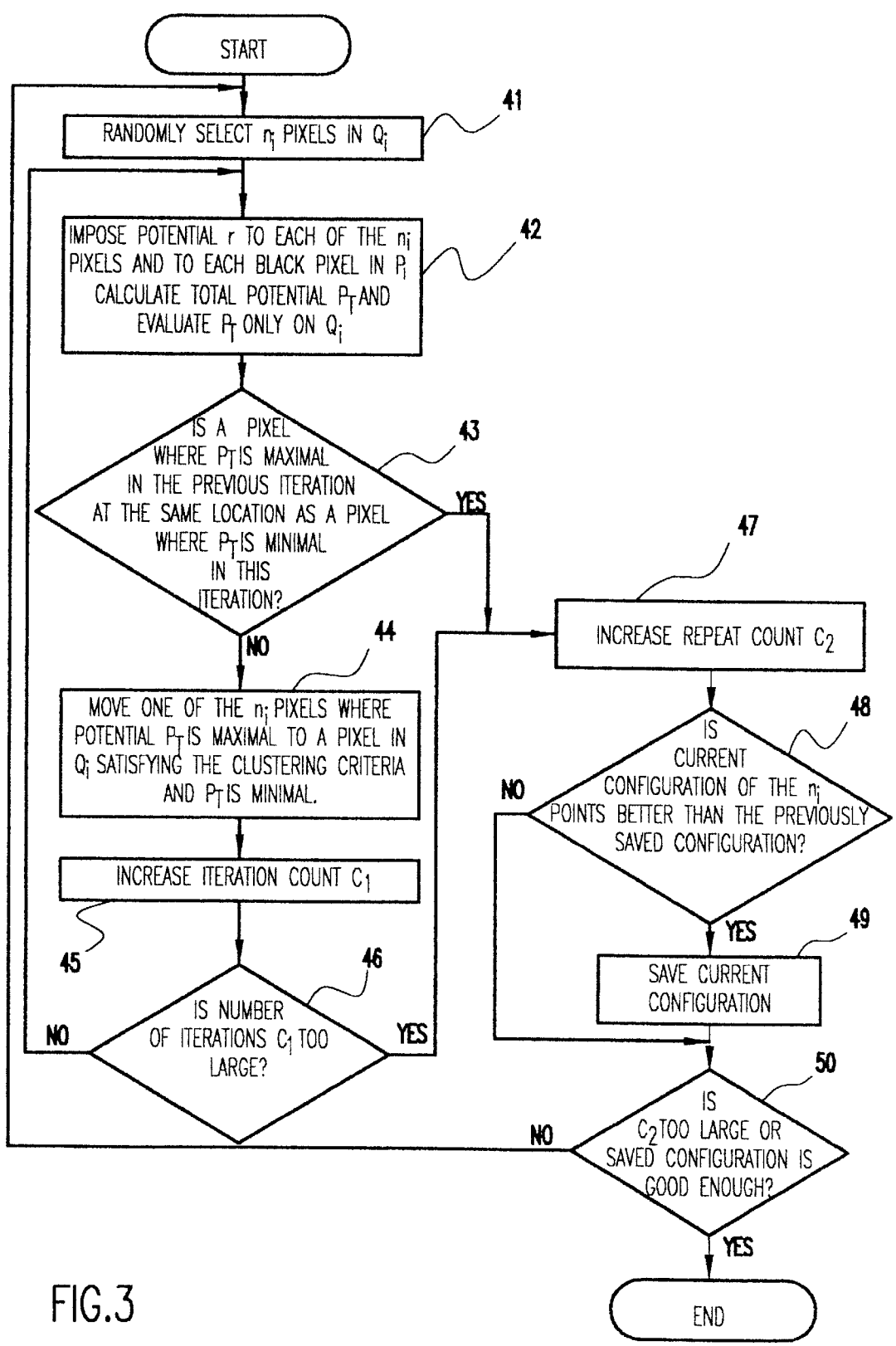
FIG. 3 is a flow diagram showing the iterative procedure for arranging pixels called by the process of FIG. 2.

Better results are obtained by choosing a potential r which depends on the grey level $g_i$ one works with (see function block 42 in FIG. 3).

A pattern is an m×n matrix of "0s" and "1s". The "0s" correspond to white pixels and the "1s" correspond to black pixels. To each pattern $P_i$ corresponds a grey level $g_i$ ($0 \leq g_i \leq 1$) which is defined as the proportion of black pixels in $P_i$. We choose a sequence of patterns which are visually pleasing and/or desirable according to some criteria); e.g., a clustering criteria (this set of patterns will be referred to as the set of chosen patterns). Note that the clustering criteria is determined visually, and empirically chosen. Each pattern is used to render a particular level of grey. The sequence of patterns must satisfy a subset condition: for any two patterns $P_i$ and $P_{i+1}$, any pixel which is black in $P_i$ is also black in $P_{i+1}$. The number of patterns in this sequence is less than the total number of grey levels and contains at least two patterns: all "0s" and all "1s". Additional patterns are added corresponding to any intermediate patterns which are considered "good" and which we want to appear in the final mask. The dither mask is initialized so as to generate these patterns at the corresponding grey levels.

By clusters we mean any grouping of black dots, but to the contrary of the application Ser. No. 08/943,881, clusters are not preferred at all stages of the construction, but to facilitate the presentation, it is convenient to consider "no cluster" as a form of clustering.

To complete the mask, the entries of the mask for halftoning intermediate grey levels are determined by using the potential r to satisfy some collection both of aperiodicity criteria and clustering criteria.

Figure 2:
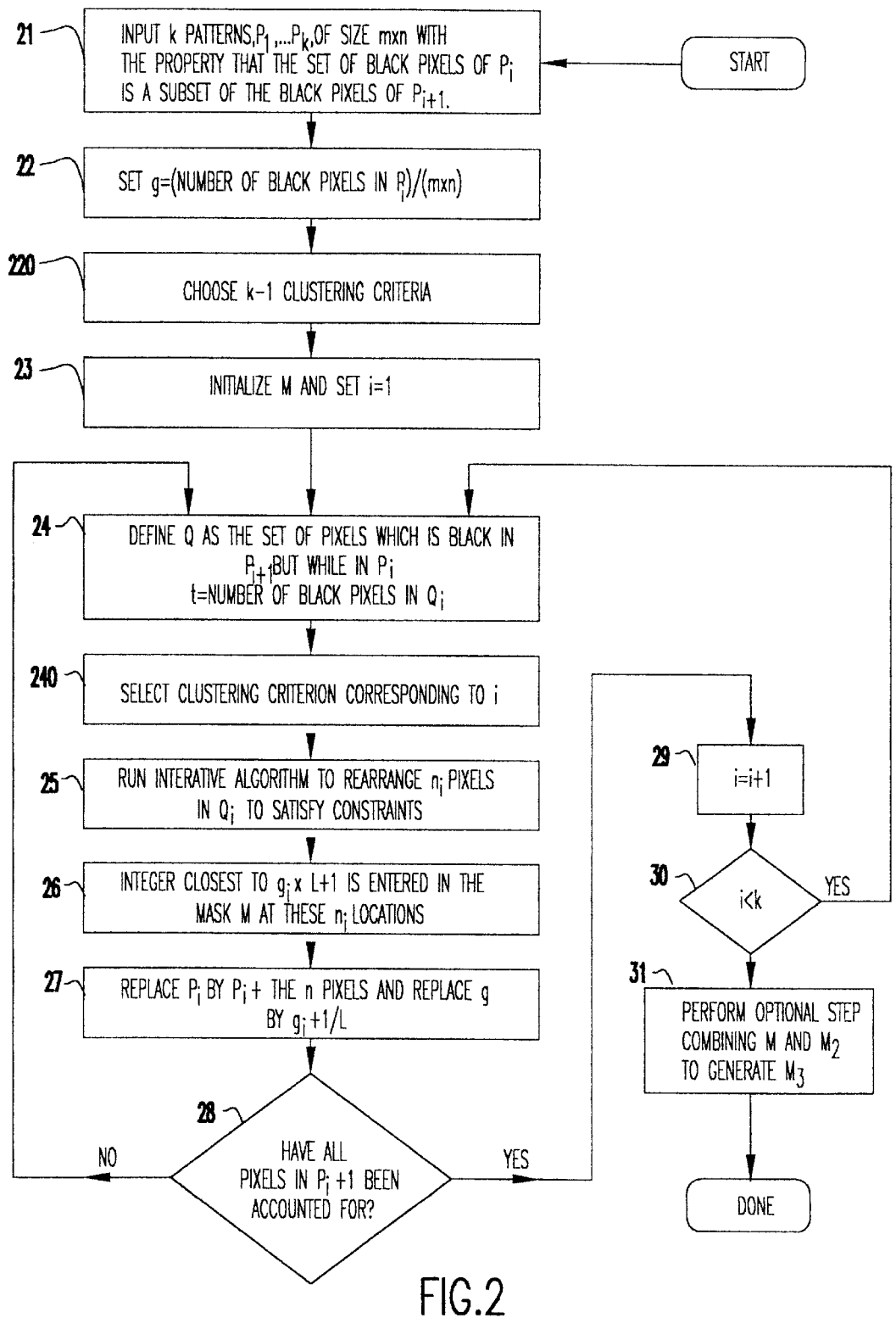
FIG. 2 is a flow diagram showing the process of generating a dither mask for the system of FIG. 1.

A flowchart of the algorithm which generates a clustered aperiodic dither mask 13 in FIG. 1 is shown in FIG. 2. There, all items carrying reference numerals under 100 are as in application Ser. No. 08/943,881. The difference resides in the presence of blocks 220 and 240 whose role is defined below. The inclusion of these new features has dramatic effects for some printers, in particular some with low resolution.

First, we select in function block 21 an ordered sequence of k chosen patterns (as defined previously) of black and white pixels $P_1, \ldots P_k$ satisfying the subset condition as described earlier. Each pattern has size m×n. Recall that for each pattern $P_i$ the corresponding grey level $g_i$ ($0 \leq g_i \leq 1$) is defined as $g_i$=(number of black pixels in $P_i$)/(m×n), as determined in function block 22.

In the preferred embodiment, the patterns $P_i$ are (possibly periodic) patterns which look pleasant. For example, one of the patterns could be where the black pixels are arranged in a checkerboard pattern.

We choose $P_1$ as the zero (pattern of all white pixels); i.e., the corresponding grey level $g_0$ is equal to 0. We choose $P_k$ as the pattern of all black pixels (i.e., a matrix of all "1s") with the corresponding grey level $g_k$=1.

At function block 220, we choose a set of clustering criteria, one for each set of patterns to be determined between $P_i$ and $P_{i+1}$ where i ranges from 1 to k−1. In the preferred embodiment, the clustering criteria can be either "no cluster", meaning that any pixel will satisfy this clustering criteria, or the clustering criteria can be "adjacent", meaning that a pixel satisfies this clustering criteria if and only if it is adjacent to the pixels in $P_i$. The property of being adjacent is determined according to the application and can depend on the gray level being dealt with (i.e., the number of black pixels in the pattern). For example, in one application two pixels may be considered adjacent if they are immediate vertical or horizontal neighbors. In another application, diagonal relationships may be preferred.

Recall that L+1 is the number of grey levels to be represented and M is the m×n dither mask.

We first initialize the mask M in function block 23 as follows:

1. For each black pixel in $P_1$, we set the corresponding entry in M to be $g_1$×L, rounded to an integer.
2. For each black pixel in $P_2$ which is not in $P_1$ we set the corresponding entry in M to be $g_2$×L, rounded to an integer.
3. For each black pixel in $P_i$ which is not in $P_1, \ldots, P_{i-1}$, we set the corresponding entry in M to $g_i$×L, rounded to an integer.

Next, we complete the mask in the following way. For each pair of adjacent patterns $P_i$ and $P_{i+1}$, we fill in the mask to generate the halftones for the grey levels between $g_i$ and $g_{i+1}$.

Starting with i=1, we define in function block 24 $Q_i$ as the set of pixels which is black in $P_{i+1}$ but not in $P_i$. The number of pixels in $Q_i$ is denoted $t_i$. Choose an integer $n_i$ approximately equal to $t_i/(L \times (g_{i+1}-g_i))$.

We then select at block 240 the clustering criterion in 220 which correspond to i.

Next, an iterative procedure (shown in FIG. 3) is called in function block 25 to rearrange $n_i$ pixels in $Q_i$ such that they satisfy three constraints:

1. These $n_i$ pixels remain within $Q_i$;
2. These $n_i$ pixels, along with $P_i$, form a sufficiently aperiodic pattern; and
3. These $n_i$ pixels, along with $P_i$, satisfy some clustering criteria.

After that, the integer closest to $g_i \times L+1$ is entered in the mask at these $n_i$ locations in function block 26. This guarantees that $P_i$ plus these pixels will be the pattern corresponding to a grey level approximately equal to $g_i+1/L$.

We replace $P_i$ by $P_i$ plus the $n_i$ pixels and replace $g_i$ by $g_i+1/L$ in function block 27. We then repeat the above steps by jumping back to function block 24. This continues until all grey levels between $g_i$ and $g_{i+1}$ are accounted for; i.e., we have placed an entry in M at the locations of all black pixels in $P_{i+1}$. This is tested in decision block 28.

We then increase i in function block 29 to fill in the mask for the grey levels between the next pair of grey levels ($g_i$, $g_{i+1}$) by jumping back to function block 24. This continues until the entire mask M is finished; i.e., all the grey levels have been taken care of. This is tested for in decision block 30. At this point, the process is complete.

The iterative procedure for arranging the $n_i$ pixels called in function block 25 is implemented in the following way, as shown in FIG. 3.

In function block 41, we randomly select $n_i$ locations in $Q_i$ satisfying the clustering criteria. We impose a potential r centered on each of the $n_i$ points and on each of the black pixels in $P_i$ in function block 42. The sum of the potentials, which we denote by $P_T$ (the total potential) is then calculated only for each point in $Q_i$ which satisfies the clustering criteria. The potential r can depend on $g_i$.

A test is made in decision block 43 to determine if a pixel having the minimal total potential $P_T$ is a pixel with the maximal total potential $P_T$ in the previous iteration. (At the first iteration, this test is not done and the algorithm jumps directly to function block 44.) If so, the algorithm jumps to function block 47. Otherwise, in function block 44 one of these $n_i$ points with the highest total potential $P_T$ is moved to a point in $Q_i$ satisfying the clustering criteria chosen at 240 with the lowest total potential $P_T$ (among the points in $Q_i$ satisfying the clustering criteria). The iteration count $C_1$ is then incremented in function block 45. A test is made in decision block 46 to determine if the iteration count $C_1$ is larger than some predetermined maximum. If so, the algorithm jumps to function block 47. Otherwise, the algorithm jumps back to function block 42 to start another iteration. In function block 47, the repeat count $C_2$ is increased. Then in function block 48, a test is made to see if the current configuration of the $n_i$ points is better than the previously saved configuration (better could mean, for instance, that the largest value minus the smallest value of the corresponding $P_T$ over all points in $Q_i$ satisfying the clustering criteria is smaller). If so, the current configuration is saved in function block 49. A test is made in decision block 50 to see if $C_2$ is larger than some predetermined maximum or if the saved configuration of the $n_i$ locations form a sufficiently blue pattern. If not, a new random set of $n_i$ locations in $Q_i$ is chosen by jumping to function block 41. Otherwise, the saved configuration of the $n_i$ points will be the final configuration to be used in function block 25.

Referring back to FIG. 2, an optional step, function block 31, can be used to combine the generated m×n mask M with another predefined $m_2 \times n_2$ mask $M_2$ into a larger (m×$m_2$)×(n×$n_2$) mask $M_3$. For instance, M could be generated with k=3, h=1 and $P_2$ a checkerboard pattern (recall that $P_1$ is all zeros and $P_k$ is all ones), while $M_2$ is a clustered dither array with a single cluster. For this example, the generated $M_3$ mask would be a clustered mask where the clusters are grown at 45° angles in an aperiodic way. Treating M, $M_2$, and $M_3$ as matrices, the pseudocode shown below generates $M_3$ in the preferred embodiment, where we use the notation M(ij) to indicate the entry of M in the $i^{th}$ row and $j^{th}$ column.

```
for i = 1 to m
    for j = 1 to n
        for i2 = 1 to m2
            for j2 = 1 to n2
                if (M(i,j) < 0.5*L) then
                    M3((i-1)*m2 + i2,(j-1)*n2 + j2) =
                        (0.5*M2(i2,j2)*n2*m2-0.5*L + M(i,j) -
                        L/(n*m))/(n2*m2) -0.5 + 0.5/(n2*m2)
                else
                    M3((i-1)*m2 + i2,(j-1)*n2 + j2) = 0.5*L +
                        (0.5* (L-M2 (i2,j2) ) *n2*m2 +
                        (L-M(i,j)))/(n2*m2) -0.5;
                end if
            end for
        end for
    end for
end for
round entries of M3 to nearest integer
```

Because $M_3$ can be much larger than M and $M_2$, we can create a very large dither array $M_3$ while the main intensive computations are performed to generate the relatively smaller mask M.

If this optional step is used, the dither mask $M_3$ will be used (rather than mask M) to halftone the image in the apparatus of FIG. 1. In particular, this optional step allows readily to create a much larger mask starting from a small one judged satisfactory except for its size. The larger (aperiodic) mask will appear as a modulated version of a periodic enlargement of the original mask (simple periodic enlargement is useless as it does not change at all the result obtained from the mask).

The method to generate mask M can be iterated as follows: After one run, one selects a set of grey level to be kept and the whole process is performed again. One can also choose to have more clustering criteria, up to one per grey level, but this extra generality can as well be replaced by the iteration procedure we just described.

Those skilled in the art will recognize that the invention can be used to correct any mask (constructed from scratch, preexisting, or adapted from a preexisting one) producing some grey levels judged appropriate and some judged inappropriate.

Also, the invention can easily be used to change the number of distinct grey level a mask can produce, proceeding as follows:

given an initial mask M, one creates an extended mask by juxtaposing several copies of M as a rectangular array, and for each grey level $f_i$ that can be rendered with the mask M, we set $P_i$ equal to the pattern of the mask M for $f_i$ and set $g_i$ equal to $f_i$.

By choosing L such that L+1 is the desired number of grey levels, we can use the method described above to generate the desired mask.

This allows one to readily extend the number of grey levels. This also allows one to decrease the number of grey levels by grouping successive grey levels of the extended mask after completion of the procedure we have described.

One can interpret the variability of the clustering criteria as a modulation of the clustering. As explained in the introduction, such modulation was judged beneficial in several cases, and essential in some cases, in particular in applications to low resolution printing devices. The following description will illustrate the improvement of the present invention over what was described in applications Ser. Nos. 08/909,535 and 08/943,881.

Figure 4A:
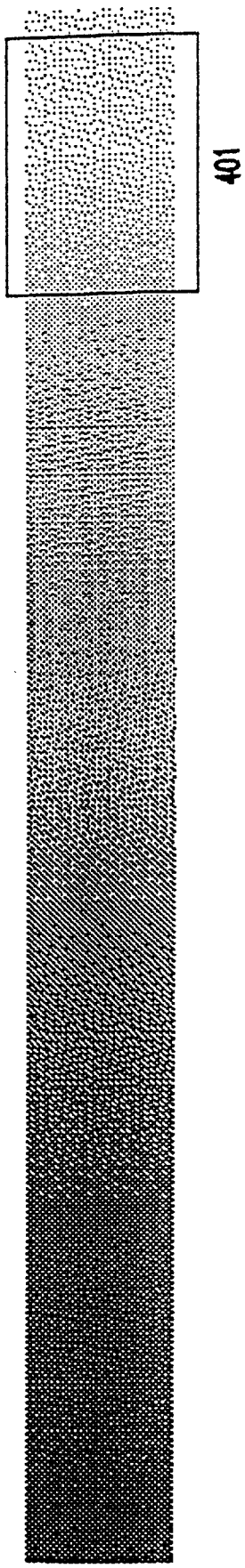
FIG. 4a shows ramps of grey levels for low resolution printing obtained with the inventions of applications Ser. Nos. 08/909,535 and 08/943,881.
Figure 4B:
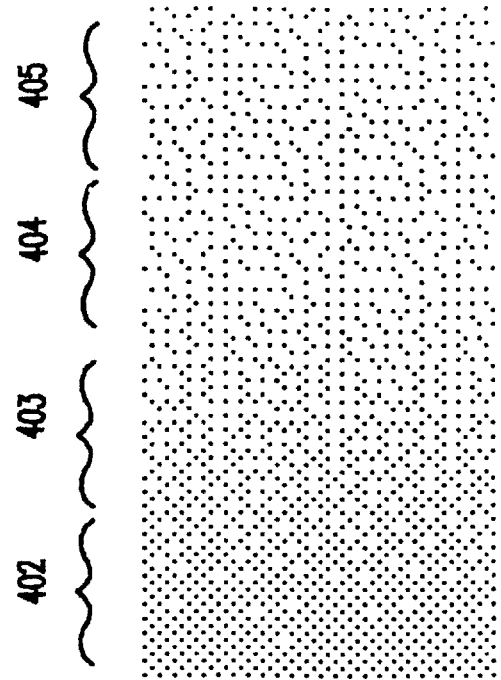

Referring now to FIG. 4A, there is shown an example of a greyscale ramp one could obtain using the previous inventions using a low resolution printer. We observe that for light grey, at blocked area 401, there are some objectionable patterns. FIG. 4B shows an enlarged view of blocked area 401. Focusing on the lighter grey areas 403 through 405, we can easily notice an objectionable periodic pattern occurring in the overall aperiodic pattern. This pattern disappears in area 402 where the overall pattern is more regular and periodic. This is partially due to the fact that the clustering is not turned on until a darker grey level.

Using the present invention to turn on clustering starting from a lighter grey, but turning clustering off for a region of grey levels, we obtain the ramps of FIG. 5A. In particular, FIG. 5A shows the greyscale obtained using the present invention. The blocked area 501 is enlarged and shown in FIG 5B. Focusing on area 505, for instance, one no longer notices an objectionable periodic pattern. The overall pattern is aperiodic. This aperiodicity is also shown as the grey area is progressively darkened as in areas 504, 503, and 502. One sees that the objectionable patterns in the lightest grey 502 through 505 have disappeared and this ramp appears smoother than the ramp of the previous inventions in FIG. 4B.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for the halftoning of grey scale images comprising the steps of:

comparing pixel-by-pixel of the image against a partially clustered aperiodic mask in which the partially clustered aperiodic mask is comprised of a partly random and partly deterministic single valued function where the clustering is modulated and designed to produce visually pleasing dot configurations when thresholded at any level of grey; and printing either a black dot or a white dot depending on an outcome of the comparing step.

2. The method of halftoning of grey scale images recited in claim 1 wherein the partially clustered aperiodic mask used in the step of pixel-by-pixel comparison has dot configurations which satisfy a multiplicity of clustering criteria for enhancing reproducibility on laser or xerographic printers and satisfies some aperiodicity criteria for the purpose of being visually pleasing.

3. The method of halftoning of grey scale images recited in claim 1 wherein said partially clustered aperiodic mask is used to halftone a color image.

4. The method of halftoning of grey scale images recited in claim 1 wherein said partially clustered aperiodic mask is used to halftone images for displaying on a multi-bit device.

5. A method of generating a partially clustered aperiodic dither mask used in halftoning grey scale images comprising the steps of:

choosing an ordered sequence of k patterns of black and white pixels $P_1, \ldots, P_k$, each pattern having size m×n, each pattern $P_i$ the corresponding grey level $g_i$ ($0 \leq g_i \leq 1$) being defined as $g_i$=(number of black pixels in $P_i$/(m×n);

initializing a mask M by:

for each black pixel in $P_1$, setting a corresponding entry in M to be $g_1 \times L$, rounded to an integer, where L+1 is equal to a maximum number of grey levels to be represented, for each black pixel in $P_2$ which is not in $P_1$, setting a corresponding entry in M to be $g_2 \times L$, rounded to an integer, and for each black pixel in $P_i$ which is not in $P_1, \ldots, P_{i-1}$, setting a corresponding entry in M to $g_i \times L$, rounded to an integer;

for each pair of adjacent patterns $P_i$ and $P_{i+1}$, filling in the mask to generate halftones for grey levels between $g_i$ and $g_{i+1}$, using a modulated clustering criterion depending on the grey level to select where successive pixels can possibly be added;

starting with i=1, defining $Q_i$ as a set of pixels which is black in $P_{i+1}$ but not in $P_i$ the number of pixels in $Q_i$ being denoted $t_i$, and choosing an integer $n_i$ approximately equal to $t_i/(L \times (g_{i+1} - g_i))$;

iteratively rearranging $n_i$ pixels in $Q_i$ such that they satisfy the constraints:
the $n_i$ pixels remain within $Q_i$,
the $n_i$ pixels, along with $P_i$, form a sufficiently aperiodic pattern, and
the $n_i$ pixels, along with $P_i$ satisfy some clustering criteria;

entering the integer closest to $g_i \times L + 1$ in the mask at the $n_i$ locations so that $P_i$ plus these pixels will be the pattern corresponding to a grey level approximately equal to $g_i + 1/L$;

replacing $P_i$ by $P_i$ plus the $n_i$ pixels and replace $g_i$ by $g_i + 1/L$ and repeating the above steps until all grey levels between $g_i$ and $g_{i+1}$ are accounted for by placing an entry in M at locations of all black pixels in $P_{i+1}$; and increasing i to fill in the mask for grey levels between a next pair of grey levels $(g_i, g_{i+1})$ until the entire mask M is finished.

6. A printer control for the halftoning of grey scale images comprising:
a partially clustered aperiodic mask comprised of a partly random and partly deterministic single valued function so as to modulate the clustering and designed to produce visually pleasing dot configurations when thresholded at any level of grey;
a comparator comparing pixel-by-pixel an input image against the partially clustered aperiodic mask; and
an output circuit generating a printer command to print either a black dot or a white dot depending on an output from the comparator.

7. The printer control recited in claim 6 wherein the partially clustered aperiodic mask has dot configurations which satisfy a clustering criteria for enhancing reproducibility on laser or xerographic printers and satisfy some aperiodicity criteria for the purpose of being visually pleasing.

8. The printer control recited in claim 6 wherein said partially clustered aperiodic mask is used to halftone a color image.

9. The printer control recited in claim 6 wherein said partially clustered aperiodic mask is used to halftone images for displaying on a multi-bit device.

10. A method for changing a number of distinct grey levels a mask can produce to be used in halftoning of grey scale images comprising the steps of:
choosing a number of grey levels L+1;
creating an extended mask by juxtaposing several copies of an initial mask M as a rectangular array; and
for each grey level $f_i$ that can be rendered with the mask M set $P_i$ equal to the pattern of the mask M for $f_i$ and set $g_i$ equal to $f_i$.

11. A method for decreasing the number of distinct grey levels a mask M can produce to be used in halftoning of grey scale images as recited in claim 10 wherein successive grey levels of the extended mask are grouped together.

12. A method of generating an enlarged partially clustered aperiodic dither mask, appearing as a modulated version of a periodic enlargement of original mask, used in halftoning grey scale images comprising the steps of:
choosing an ordered sequence of k patterns of black and white pixels $P_1, \ldots, P_k$, each pattern having size m×n, each pattern $P_i$ the corresponding grey level $g_i$ ($0 \leq g_i \leq 1$) being defined as $g_i$=(number of black pixels in $P_i$/(m×n));

initializing a mask M by
for each black pixel in $P_1$, setting a corresponding entry in M to be $g_1 \times L$, rounded to an integer, L+1 being equal to a maximum number of grey levels to be represented,
for each black pixel in $P_2$ which is not in $P_1$, setting a corresponding entry in M to be $g_2 \times L$, rounded to an integer, and
for each black pixel in $P_i$ which is not in $P_1, \ldots, P_{i-1}$, setting a corresponding entry in M to $g_i \times L$, rounded to an integer;

for each pair of adjacent patterns $P_i$ and $P_{i+1}$, filling in the mask to generate halftones for grey levels between $g_i$ and $g_{i+1}$, using a clustering criterion depending on the grey level to select where successive pixels can possibly be added;

starting with i=1, defining $Q_i$ as a set of pixels which is black in $P_{i+1}$ but not in $P_i$, the number of pixels in $Q_i$ being denoted $t_i$, and choosing an integer $n_i$ approximately equal to $t_i/(L \times (g_{i+1} - g_i))$;

iteratively rearranging $n_i$ pixels in $Q_i$ such that they satisfy the constraints:
the $n_i$ pixels remain within $Q_i$,
the $n_i$ pixels, along with $P_i$ form a sufficiently aperiodic pattern, and
the $n_i$ pixels, along with $P_i$ satisfy some clustering criteria;

entering the integer closest to $g_i \times L + 1$ in the mask at the $n_i$ locations so that $P_i$ plus these pixels will be the pattern corresponding to a grey level approximately equal to $g_i + 1/L$;

replacing $P_i$ by $P_i$ plus the $n_i$ pixels and replace $g_i$ by $g_i + 1/L$ and repeating the above steps until all grey levels between $g_i$ and $g_{i+1}$ are accounted for by placing an entry in M at locations of all black pixels in $P_{i+1}$; and increasing i to fill in the mask for grey levels between a next pair of grey levels $(g_i, g_{i+1})$ until the entire mask M is finished; and combining the generated m×n mask M with another predefined $m_2 \times n_2$ mask $M_2$ into a larger $(m \times m_2) \times (n \times n_2)$ mask $M_3$.

13. A method for the halftoning of grey scale images comprising the steps of:
comparing pixel-by-pixel of the image against an enlarged partially clustered aperiodic mask in which the enlarged partially clustered a periodic mask is comprised of a partly random and partly deterministic single valued function where the clustering is modulated and designed to produce visually pleasing dot configurations when thresholded at any level of grey; and
printing either a black dot or a white dot depending on an outcome of the comparing step.

14. The method of halftoning of grey scale images recited in claim 13 wherein the enlarged partially clustered aperiodic mask used in the step of pixel-by-pixel comparison has dot configurations which satisfy a multiplicity of clustering criteria for enhancing reproducibility on laser or xerographic printers and satisfies some aperiodicity criteria for the purpose of being visually pleasing.

15. The method of halftoning of grey scale images recited in claim 13 wherein said enlarged partially clustered aperiodic mask is used to halftone a color image.

16. The method of halftoning of grey scale images recited in claim 13 wherein said enlarged partially clustered aperiodic mask is used to halftone images for displaying on a multi-bit device.

17. A printer control for the halftoning of grey scale images comprising:

an enlarged partially clustered aperiodic mask comprised of a partly random and partly deterministic single valued function where the clustering is modulated and designed to produce visually pleasing dot configurations when thresholded at any level of grey;

a comparator comparing pixel-by-pixel an input image against the enlarged partially clustered aperiodic mask; and an output circuit generating a printer command to print either a black dot or a white dot depending on an output from the comparator.

18. The printer control recited in claim 17 wherein the enlarged partially clustered aperiodic mask has dot configurations which satisfy a clustering criteria for enhancing reproducibility on laser or xerographic printers and satisfy some aperiodicity criteria for the purpose of being visually pleasing.

19. The printer control recited in claim 17 wherein said enlarged partially clustered aperiodic mask is used to halftone a color image.

20. The printer control recited in claim 17 wherein said enlarged partially clustered aperiodic mask is used to halftone images for displaying on a multi-bit device.

21. A machine readable medium containing code for the halftoning of grey scale images, the code implementing the steps of:

comparing pixel-by-pixel of the image against a partially clustered aperiodic mask in which the partially clustered aperiodic mask is comprised of a partly random and partly deterministic single valued function where the clustering is modulated and designed to produce visually pleasing dot configurations when thresholded at any level of grey; and printing either a black dot or a white dot depending on an outcome of the comparing step.

22. The machine readable medium containing code for halftoning of grey scale images recited in claim 21 wherein the partially clustered aperiodic mask used in the step of pixel-by-pixel comparison is implemented by the code to have dot configurations which satisfy a multiplicity of clustering criteria for enhancing reproducibility on laser or xerographic printers and satisfies some aperiodicity criteria for the purpose of being visually pleasing.

* * * * *